Oct. 30, 1934.  F. J. SPRAGUE  1,978,966
APPARATUS FOR THE MANUFACTURE OF PERFORATED RECORDS
Filed July 6, 1931  9 Sheets-Sheet 1

Oct. 30, 1934.　　　F. J. SPRAGUE　　　1,978,966
APPARATUS FOR THE MANUFACTURE OF PERFORATED RECORDS
Filed July 6, 1931　　　9 Sheets-Sheet 2
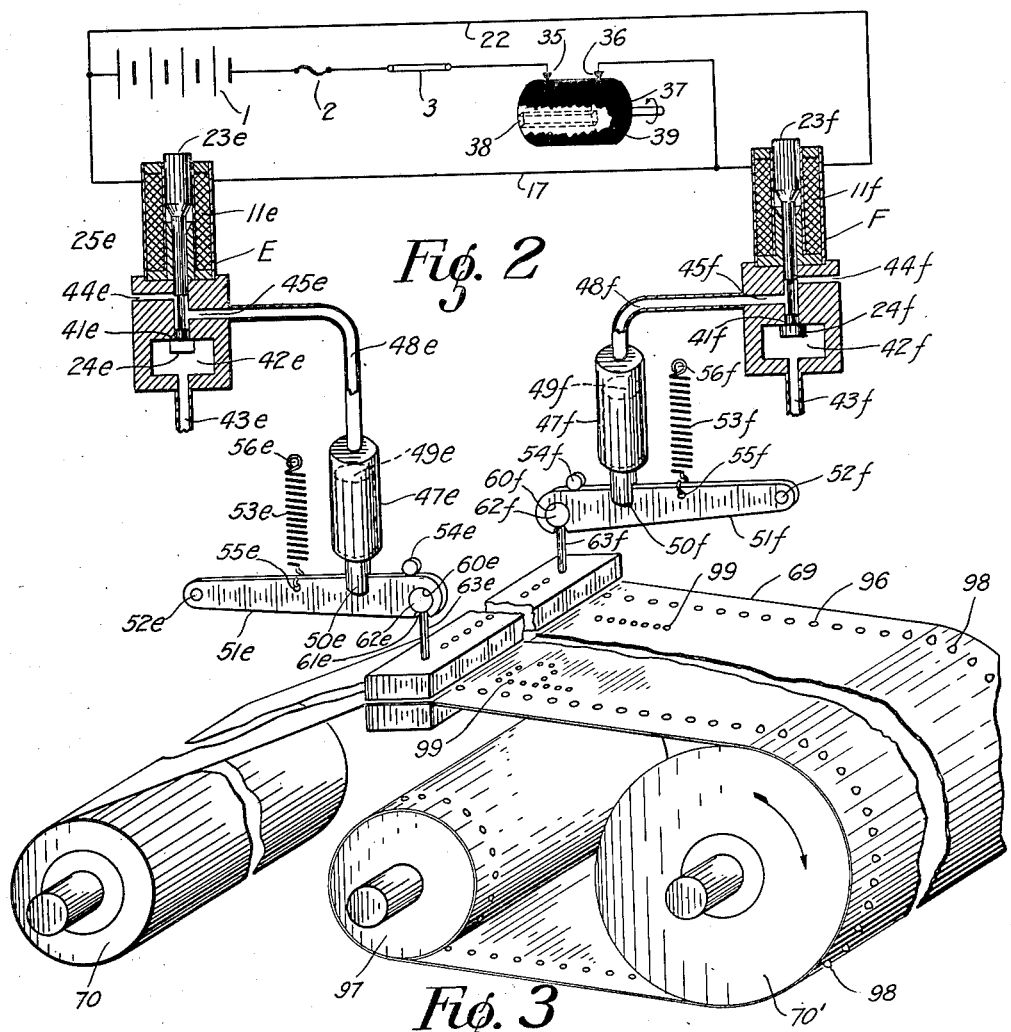
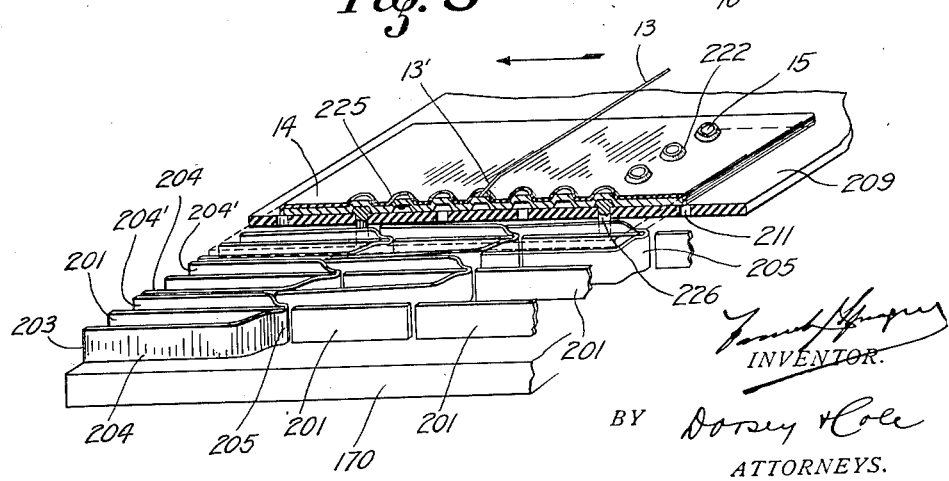

Oct. 30, 1934.　　　F. J. SPRAGUE　　　1,978,966
APPARATUS FOR THE MANUFACTURE OF PERFORATED RECORDS
Filed July 6, 1931　　　9 Sheets-Sheet 3
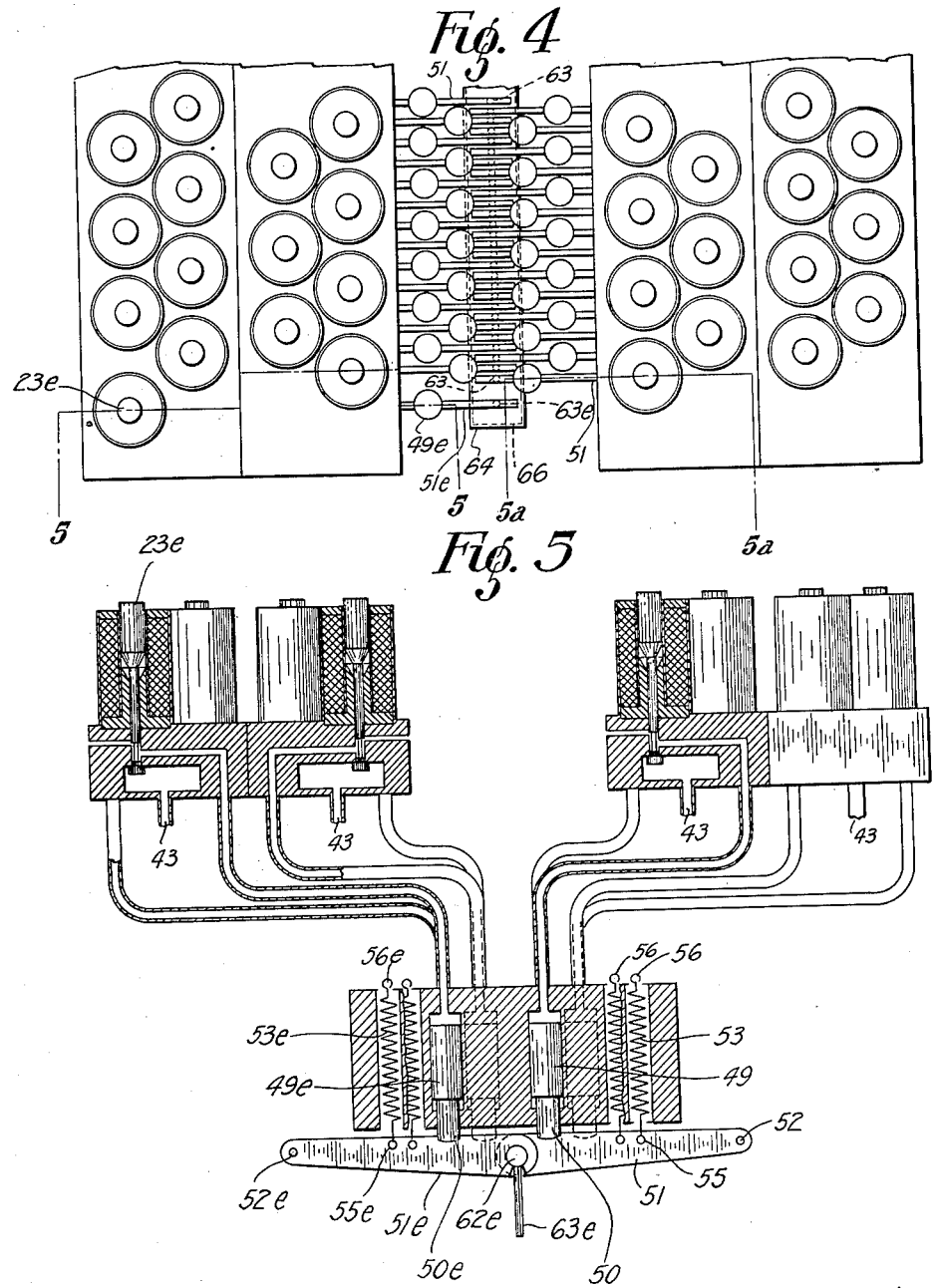

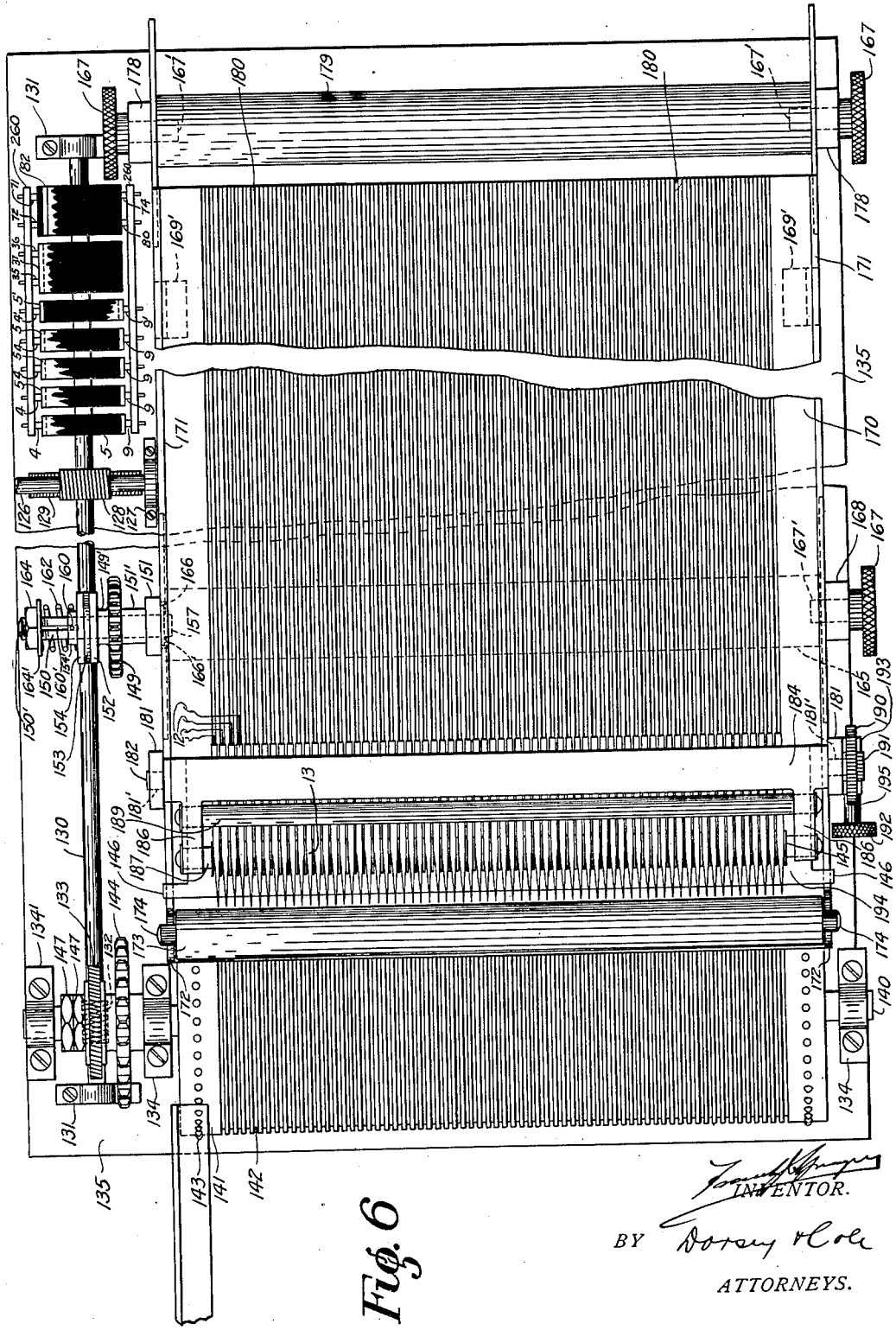

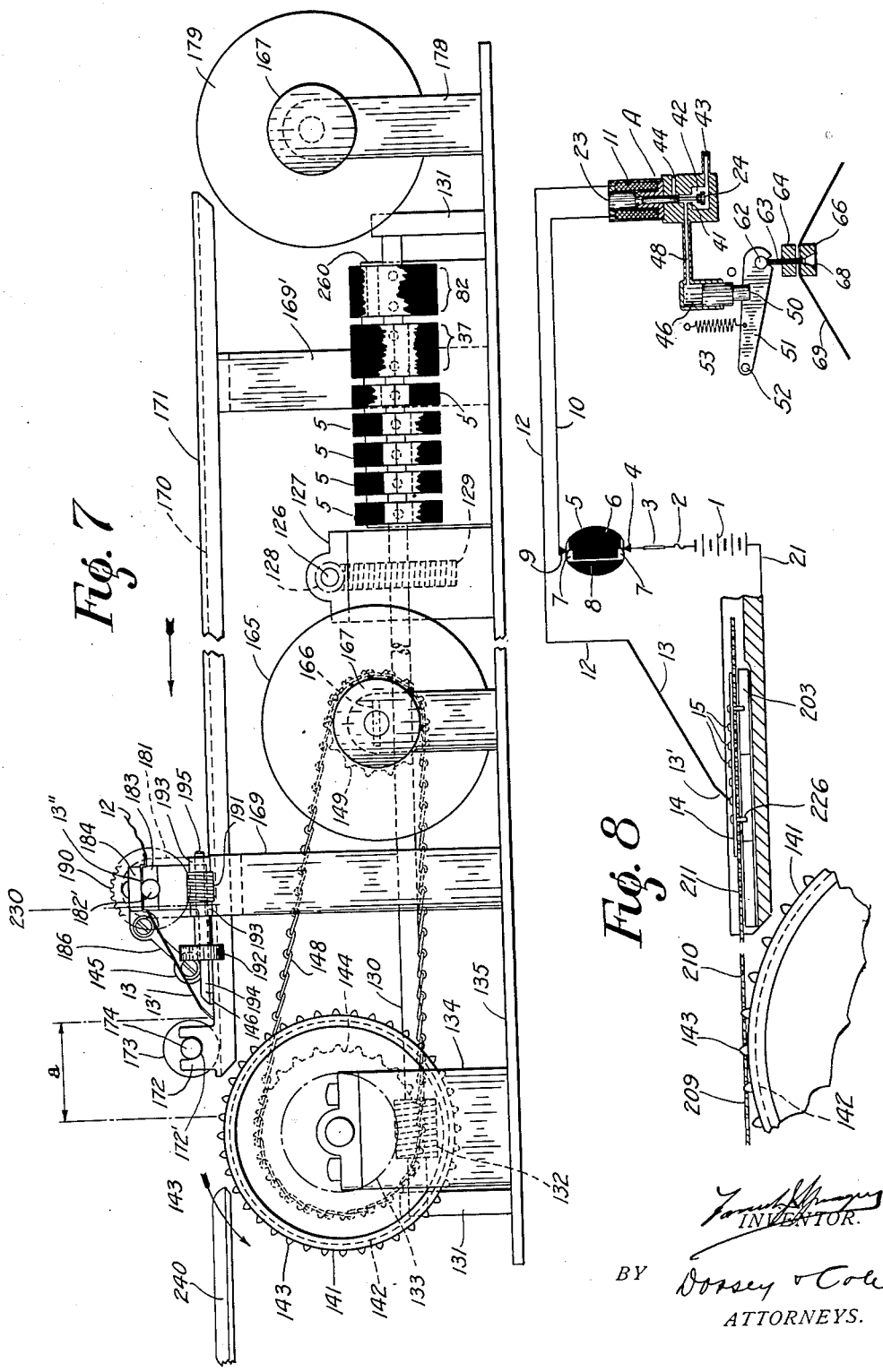

Oct. 30, 1934.　　　F. J. SPRAGUE　　　1,978,966
APPARATUS FOR THE MANUFACTURE OF PERFORATED RECORDS
Filed July 6, 1931　　　9 Sheets-Sheet 6

INVENTOR.
BY *Dorsey & Cole*
ATTORNEYS.

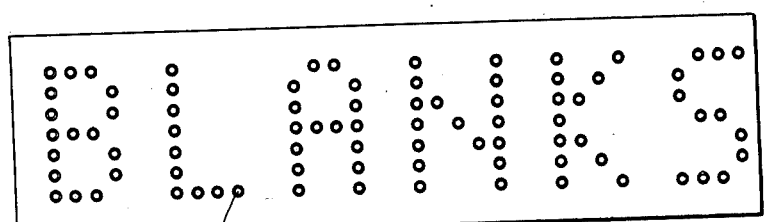
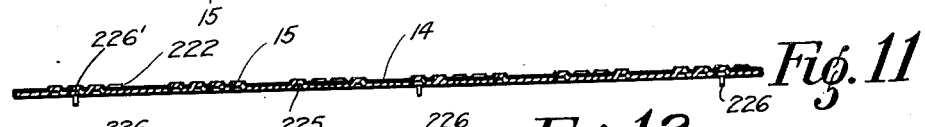
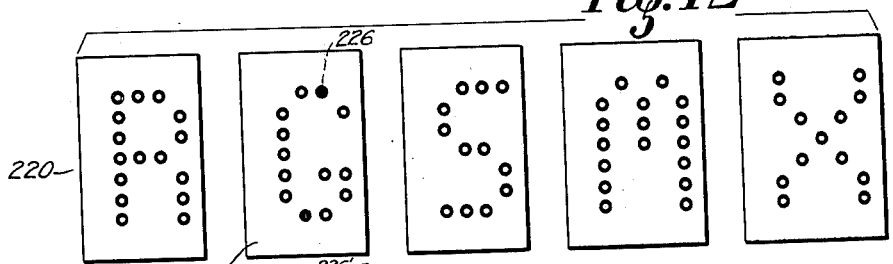
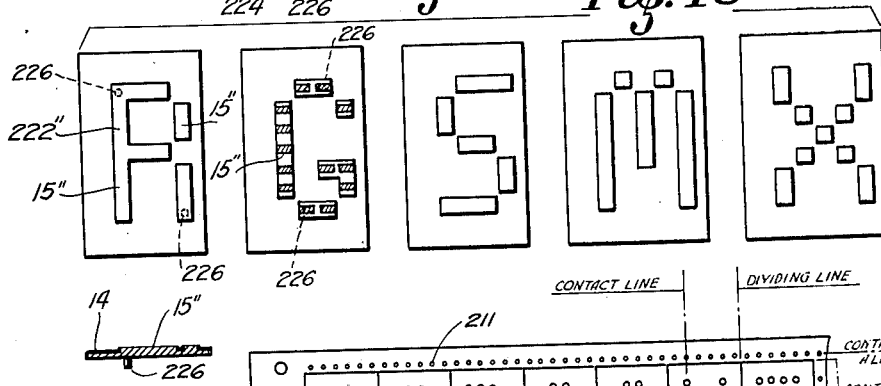
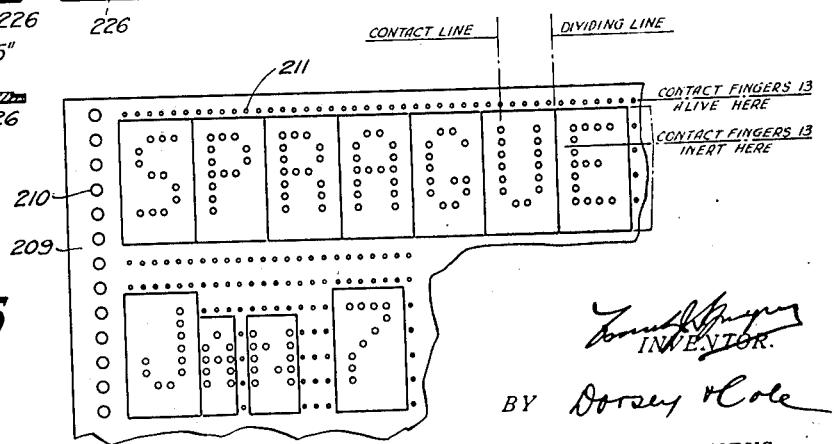

Oct. 30, 1934.  F. J. SPRAGUE  1,978,966
APPARATUS FOR THE MANUFACTURE OF PERFORATED RECORDS
Filed July 6, 1931  9 Sheets-Sheet 8

Oct. 30, 1934.   F. J. SPRAGUE   1,978,966
APPARATUS FOR THE MANUFACTURE OF PERFORATED RECORDS
Filed July 6, 1931   9 Sheets-Sheet 9

Patented Oct. 30, 1934

1,978,966

UNITED STATES PATENT OFFICE 1,978,966

APPARATUS FOR THE MANUFACTURE OF PERFORATED RECORDS

Frank J. Sprague, New York, N. Y., assignor to Sprague Signs, Inc., Wilmington, Del., a corporation of Delaware Application July 6, 1931, Serial No. 549,078

11 Claims. (Cl. 164—115)

My invention relates to apparatus for the manufacture of perforated records, and more particularly for records later used to display electric signs.

In my copending application, Ser. No. 408,347, filed Nov. 19, 1929, now Patent No. 1,835,912, issued December 8, 1931, I have described an electric sign system adapted to display changing and moving signs of different character and type by a simple and flexible control of an organization of massed electric lamps.

One feature of the above invention relates to the display of running words, sentences or prearranged designs initiated and controlled by perforated records co-operating with proper electric contacts and circuits, whereby the lamps of a display board are illuminated in conformance with the perforations of the record.

The present invention relates to the apparatus used for producing such perforated records. However, it should be well understood that my invention is not limited to records used with my above referred to sign system, nor is it limited to records for electric signs, but may be applied to perforated records for other uses.

One object of my invention is to provide an apparatus to produce perforated records in an expedient way.

A further object of my invention is to provide means whereby any desired text or design of any character may be set up conveniently and flexibly both in spacing and sequence, and transferred on a record.

A still further object of my invention is to produce such records with a simple, compact and inexpensive apparatus.

A still further object of my invention is to provide a contact selecting and record punching apparatus, which is automatic in operation except for the setting up of the pattern.

A still further object of my invention is to provide means which require only slight skill in the setting up of the pattern.

Other objects of my invention will appear as the specification progresses.

In the drawings which form part of this specification, Figure 1 is a schematic diagram of an apparatus for the production of perforated records from patterns comprising the punching apparatus, contact selecting means, and the pneumatic and electric devices, and circuits for their control.

Fig. 2 is a schematic diagram of the punches for the lead holes of the perforated records, and their pneumatic and electric control means.

Fig. 3 is a fragmentary perspective view of one end of the selecting platform, also showing a portion of a type letter with the platen, and a contact finger of the selector.

Fig. 4 is a plan view showing the disposition and relative arrangement of the pneumatic valves, plungers and punches of the punching apparatus.

Fig. 5 is a side elevation partly in section of the apparatus of Fig. 4, taken on the lines 5—5 and 5a—5a, of Fig. 4.

Fig. 6 is a plan view of the contact selector with its drive mechanism and the circuit-breakers for the control of the punching apparatus.

Fig. 7 is a side elevation of the apparatus shown in Fig. 6.

Fig. 8 is an enlarged view of part of the apparatus shown in Fig. 7, also showing schematically the punch, electro-pneumatic valve and its circuit controlled by a contact finger.

Fig. 10 is a plan view of one form of pattern for a type word.

Fig. 11 is a sectional elevation of Fig. 10.

Fig. 12 is a plan view of a group of individual type letters.

Fig. 12a is a sectional elevation of one letter of the group of Fig. 12.

Fig. 13 is a plan view of a group of individual type letters representing the same characters as those of Fig. 12, but having another construction.

Fig. 14 is a sectional elevation of one letter of the group of Fig. 13.

Fig. 15 is a partial plan view of a set-up of type letters on a platen.

Figure 1:
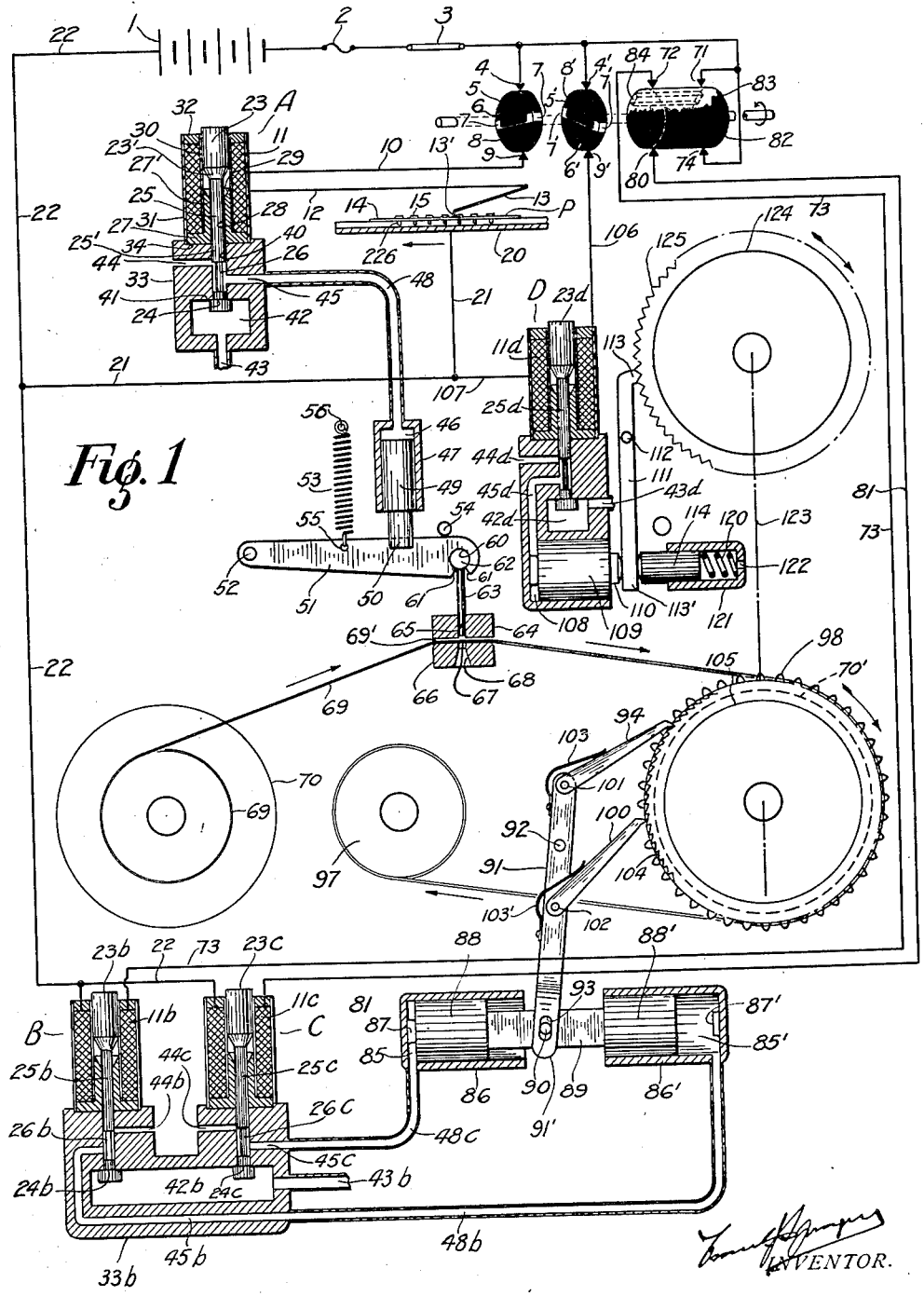

Referring to Fig. 1, a spool 70 carries a roll 69 of paper or other suitable flexible insulating material which, by means later to be described, is rolled on a spool 97 over a drum 70′. The paper at its portion 69′ is passed between two blocks 64 and 66, forming part of the punching apparatus later described.

The pattern P more fully described hereafter, comprises insulated portions 14 and conductive portions 15, hereafter referred to as contacts, and cooperates with contact fingers 13. Thereby when a contact finger 13 comes to rest on a cooperating contact 15 an electric circuit is closed at this point, which, provided the circuit is otherwise established, energizes the coil 11 of an electro-pneumatic valve A individual to the finger 13. Such energization causes, by means later to be described, actuation of a punch 63 individual to the valve A and the finger 13, whereby a hole is perforated on the paper, the disposition of which corresponds to that of the contact 15 of the pattern.

The energizing circuit of the coil 11 comprises a battery or a suitable source of electric supply 1, a switch 3, and preferably, interposed between the two, a fuse 2, a rotating circuit-breaker 5, conductor 10, coil 11, conductor 12, contact finger 13, contact 15, which by means of a contact pin 226 contacts with a metal base 20 in a manner later to be described; the circuit being completed from the base 20 through conductors 21 and 22 to the battery.

The circuit-breaker 5 comprises a rotary disc 6 of insulating material in which are embedded two peripheral oppositely located short contact segments 7—7 interconnected by an embedded connector 8. Two oppositely located contact brushes or springs 4 and 9 cooperate with the rotary disc.

It should be noted that by means later to be described rotation of the disc 6, the advance of the paper 69 and advance of the pattern P are so interlocked that the disc 6 will complete one revolution between the time that the contact finger 13 contacts with two successively spaced contacts 15, and the paper 69 will be advanced a distance corresponding to the progress of the pattern. It should be understood that if desired, other fixed relations between the rotation of the circuit-breaker, the advance of the pattern and the advance of the paper may be provided.

It should be further noted that the contact segments 7—7 are so disposed and proportioned relative to the advance of the pattern, that the circuits of the coils 11 are made and broken at the circuit-breakers, instead of at the contacts 13—15.

From the above it will be seen that a coil 11 will be energized when its respective contact finger 13 contacts with a corresponding contact 15 of the pattern, but the circuit will be established only while the circuit-breaker 5 is closed, whereby burning of the contacts 13 and 15 is prevented.

I shall now describe the construction and function of the electro-pneumatic valves A. This valve comprises a manifold 33 provided with an air chamber 42 which has on its bottom a port 43 connecting with a suitable source of pressure air (not shown). A port 45 provided on one side of the manifold 33, connects with a pipe 48 leading to a chamber 46 of a cylinder 47 hereafter described. A third port 44 is provided on the other side of the manifold and leads to atmosphere.

The coil 11 is mounted on top of the manifold and is surrounded by a sleeve 31 of magnetic material. On the bottom of the coil is provided a disc 27 of magnetic material, which comprises a central upward projecting cylindrical portion 27' having a central bore 28. The portion 27' protrudes to the center of the coil and forms at its top a cone-shaped seat 29. At the top the coil 11 is provided with a perforated disc 32, which is fastened to the sleeve 31. The coil is provided with an inside sleeve 30 of non-magnetic material.

A plunger is located within the sleeve 30 and consists of an upper cylindrical portion 23 upwardly projecting through disc 32 and of a lower conical portion 23' adapted to cooperate with the seat 29. The portion 23' has a downward extending stem 25 loosely guided in the bore 28. The stem 25 projects downwardly through the disc 27 into a central bore 40 of the manifold and extends in a reduced portion 26 which carries on its lower end a valve 24 projecting into the chamber 42. The valve 24 cooperates with a valve seat 41 of the manifold formed on the top of the chamber 42, said valve controlling communication between the chamber 42 and bore 40, thereby controlling admission of air from pipe 43 to pipe 48.

When the coil 11 is energized, the plunger 23 is depressed, whereby its conical portion 23' is seated on seat 29. This opens valve 24 to admit pressure air from chamber 42 through 41, bore 40 and port 45 to the pipe 48. At the same time the lower portion 25' of the stem 25 blanks the port 44, preventing escape of pressure air from the bore 40.

When the magnet is deenergized the plunger 23 is forced upwardly by the air pressure exerted on valve 24 and assumes the position shown in Fig. 1. In this position the valve 24 is seated against seat 41, and passage between bore 40 and chamber 42 is blanked. At the same time connection between ports 44 and 45 is established through bore 40 and pipe 48 vented to atmosphere. It should be noticed that in case grit or any other substance would tend to keep the valve 24 from properly seating, this will not cause pressure air to pass to pipe 48, as such air is vented to atmosphere through port 44.

From the above it will appear that pressure air will be fed to pipe 48 whenever the solenoid 11 is energized, and will be exhausted therefrom whenever the solenoid is deenergized.

The pipe 48, as stated, is connected to a cylinder 47 in which is reciprocally disposed a piston 49. The piston 49 carries on its lower end a forked extension 50, which straddles a lever 51 pivoted at one end at 52. On its other end the lever 51 is provided with a bore 60, which engages the head 62 of a punch 63, proper clearances 61—61, being provided for the punch.

There is provided for each contact finger 13 a corresponding electro-pneumatic valve A and a punch 63 controlled thereby, and the electro-pneumatic valves A and the means to actuate the punches are staggered while the punches are located in a single horizontal row, this being shown in Figs. 2, 4 and 5, later more fully described.

The punches 63 cooperate with a common guide block 64 provided with guide holes 65 for each of the punches 63. (See Fig. 4). Under the guide block 64 is located a die block 66 (see Fig. 1), which is provided with dies 67, one for each punch 63. The paper, as stated, passes for its perforation between the blocks 64 and 66, and clearance holes 68 are provided in the block 66 through which the punchings of the paper fall.

When no air is admitted to pipe 48, as is the case shown in Fig. 1, the punch 63 is raised by the lever 51 due to the action of a coil spring 53, which is anchored at 56 and engages the lever 51 at 55, thereby causing the latter to abut against a stop 54.

In their raised positions the punches 63 are retracted within the guide block 64, whereby they do not interfere with the passage of the paper between the blocks 64 and 66. However, when a magnet 11 corresponding to a contact finger 13 is energized, air is admitted to the corresponding pipe 48, causing the corresponding piston 49 and punch 63 to be depressed and the latter perforates a hole in the paper.

Figs. 4 and 5 illustrate the actual disposition of the electro-pneumatic valves A with their manifolds, pipes as well as the plungers 49, levers 51 and punches 63 controlled thereby.

The disposition of the parts is such as to provide alignment of the punches in a single horizontal row and at the same time to permit organization of the other actuating parts in a symmetrical compact arrangement, easy to assemble and in which each part is easily accessible.

The punches 63, as stated, are disposed in a single row; whereas the levers 51 operating the same are divided towards the left and right so as to form two rows.

The plungers actuating these levers requiring more space are further staggered so as to form two rows on each side of the punches 63.

The electro-pneumatic valves A requiring still more space than the plungers 49, are further staggered so as to form four rows on each side of the punches. It should be noted that the manifolds of each two rows of the electro-pnuematic valves form a single structure.

For the energization of the electro-pneumatic valves a single source of energy suffices, and also a single circuit-breaker 5 may be provided for the control of all the electro-pneumatic valves A; however, I prefer to use a plurality of such circuit-breakers, for instance, four as illustrated in Fig. 6, each controlling two rows of electro-pneumatic valves A.

To advance the paper 69 the drum 70' is provided (Fig. 1) with a ratchet wheel 105, which is intermittently rotated in clockwise direction by electrically controlled and pneumatically operated pawls 94 and 100, said pawls engaging the teeth 104 of the ratchet wheel 105. While a single pawl may be used, I prefer to use two pawls to increase the operating speed. The pawls 94 and 100 are pivoted on a common lever 91, which is fulcrumed at 92, whereby the upper pawl 94 is pivoted at 101 at the upper end of the lever, and the pawl 100 is pivoted at 102 below the fulcrum 92, the two pivoting points 101 and 102 being at equal distances from the fulcrum. Springs 103 and 103' press the pawls 94 and 100 against the ratchet wheel 105.

The lower end of the lever 91 forms a fork 91', which straddles a rectangular rod 89 and loosely engages by means of slots 93—93, pins 90—90 projecting from both sides of the rod 89. The rod 89 serves as a common piston rod for two pistons 88 and 88' carried at each end of the rod 89. The pistons 88 and 88' reciprocate in cylinders 86 and 86', respectively, the cylinders being open at the inner ends and closed at their outer ends to form chambers 85 and 85', respectively. Stops 87 and 87' are provided in the cylinder heads to limit the movement of the pistons.

The cylinders 86 and 86' are connected by means of pipes 48c and 48b to electro-pneumatic valves C and B respectively. The electro-pneumatic valve B and the electro-pneumatic valve C are identical in construction to the electro-pneumatic valves A previously described, except that they have a common air chamber 42b, which is supplied with pressure air through a pipe 43b.

The coils 11b and 11c of the electro-pneumatic valves B and C are energized alternately, to alternately admit pressure air to the chambers 85' and 85 behind the pistons 88' and 88, respectively. Thereby when coil 11b is energized coil 11c is deenergized and vice versa.

Energization of the coils 11b and 11c is controlled by a common circuit-breaker 82, which comprises a drum or cylinder 83 of insulating material, having on its surface a conductive strip 84 which extends along the length of the drum. Cooperating with the drum and its conducting strip 84 are two pairs of contact brushes or springs 71—72 and 74—80 located along the length of the drum, said contact brush pairs being diametrically opposed to each other.

The circuit of the coil 11b is established when the contact pair 71—72 is bridged by the strip 84 as follows,—from battery 1, through fuse 2, switch 3, contact 71 and strip 84, through contact 72, conductor 73, to coil 11b, conductor 22 and back to battery.

Similarly the circuit for the coil 11c is established when the contact pair 74—80 is bridged by the strip 84 as follows,—from the battery 1, through fuse 2, switch 3, contacts 74, strip 84, contact 80, conductor 81, to the coil 11c, conductor 22 and back to battery.

The circuit-breaker 82 as shown in Figs. 1, 6 and 7 is rotated in fixed relation with the circuit-breakers 5. However, its contact strip 84 is shifted in regard to the contacts 7—7 of the circuit-breakers 5.

When the coil 11c of the electro-pneumatic valve C is energized pressure air is admitted through pipe 48c to chamber 85, at the same time coil 11b is deenergized and air exhausted from the chamber 85'.

The pressure exerted on piston 88 causes the two pistons to move to the right. When in its turn coil 11b is energized and 11c deenergized the double piston for similar reasons is moved to the left. The lever 91 due to its connection with the piston rod 89 follows the movement of the pistons and causes alternate engagement of the pawls 94 and 100 with the teeth 104 of the ratchet wheel 105.

When the pistons are in the extreme left position, as shown in Fig. 1, pawl 94 engages a tooth 104 and pawl 100 is about half-way between two teeth. When the pistons are now moved to the right the pawl 100 first takes up its slack and then advances the ratchet wheel, whereas the pawl 94 assumes at the end of the stroke a position about half-way between two teeth. Movement of the pistons to the left will now cause the pawl 94 to take up its slack and advance the ratchet wheel and the pawl 100 to assume a position between two teeth.

In this way the drum 70 is advanced by the alternate action of the two pawls, whereby at each half revolution of the circuit-breaker 82 the ratchet is rotated by a distance corresponding to one tooth and the paper advanced by a corresponding distance, which corresponds to the advance of one space of the pattern.

To overcome the inertia of the drum 70' and to insure the proper stepped advance of the roll, a toothed wheel 124 is connected to the drum 70', said wheel being shown in Fig. 1 directly above the drum 70' with the connection thereto diagrammatically indicated by the dotted center line 123.

Cooperating with the teeth 125 of the wheel 124 is a lever arm 111 pivoted at 112 and having a tooth shaped head 113 adapted to engage the teeth 125 of the wheel 124. The lower end 113' of the lever 111 is positioned between a plunger 150

114 and a plunger 110, which control the movement of the lever, as hereinafter explained. The plunger 114 is located in a cylinder 121 and biased by a spring 120, which presses it against the end 113' of the lever 111. A vent hole 122 is provided in the head of the cylinder 121.

Action of the plunger 114 on the lever 111 tends to engage the end 113' of said lever with the teeth 125 of the wheel 124. On the other hand the plunger 110, which forms an extension of an air-operated piston 109, overcomes when actuated the pressure exerted on plunger 114 and moves the lever end 113' to the right, thereby disengaging the lever head 113 from the wheel teeth 125.

The piston 109 is controlled by an electropneumatic valve D, which is in every respect identical in construction and operation with the electro-pneumatic valves A previously described. Energization of the electro-pneumatic valve D causes pressure air to be admitted through port 45d, thereby actuating the piston 109.

The coil 11d of the electro-pneumatic valve D is controlled by means of a circuit-breaker 5', which is fixed on a common shaft with the circuit-breakers 5 and is identical in every respect with these circuit-breakers, except that the contact segment pair 7'—7' is shifted with regard to the contact segment pairs 7—7 of the circuit-breakers 5.

The circuit of the coil 11d is as follows,—from the battery 1 through fuse 2, switch 3, circuit-breaker 5', conductor 106, coil 11d, conductors 107, 21 and 22 back to battery.

In addition to the punches 63 controlled by the contacts 15 of the pattern, there are also provided at the two extreme ends of the blocks 64 and 66 (see Fig. 2) two punches 63e and 63f for the perforation of the guide holes for the proper advance of the perforated roll. These punches 63e and 63f, which are preferably larger in diameter than the punches 63 and are separated from the outside punches 63 by a margin, are controlled by two electro-pneumatic valves E and F, controlling plungers 49e and 49f and punch levers 51e and 51f, whereby electro-pneumatically operated valves E and F and their plungers and punch levers are identical in construction and operation with the electro-pneumatic valves A and their plungers and punch levers.

The electro-pneumatic valves E and F are energized in unison and are controlled by a common circuit-breaker 37, which closes their circuits at half the rate at which the circuit-breakers 5 and 5' close their respective circuits.

The circuit-breaker 37 consists of a cylinder 39 of insulating material, provided with a single conducting strip 38 extending along the length of the cylinder and two brushes or contact springs 35 and 36 located on one side of the cylinder and adapted to be bridged by the strip 38.

The energizing circuits of the coils 11e and 11f are as follows: from battery 1, through fuse 2, switch 3, circuit-breaker 37, coils 11e and 11f (in multiple) and back to battery.

The circuit-breaker 37 rotates on a common shaft with the previously described circuit-breakers 5, 5' and 82, and its contact strip is in alignment with one of the contact segments 7 of a circuit-breaker 5.

The guide perforations 96 punched by the punches 63e and 63f engage correspondingly disposed and spaced pins 98 provided on the drum 70'; such engagement insuring a fixed rate of advance of the paper when the drum is rotated, i. e., advanced in steps as previously described.

The patterns for the control or selective energization of the electro-pneumatic valves A may be of any suitable form and their cooperative engagement with and respective advance to the contact fingers 13 may be accomplished in various ways.

Figure 9:
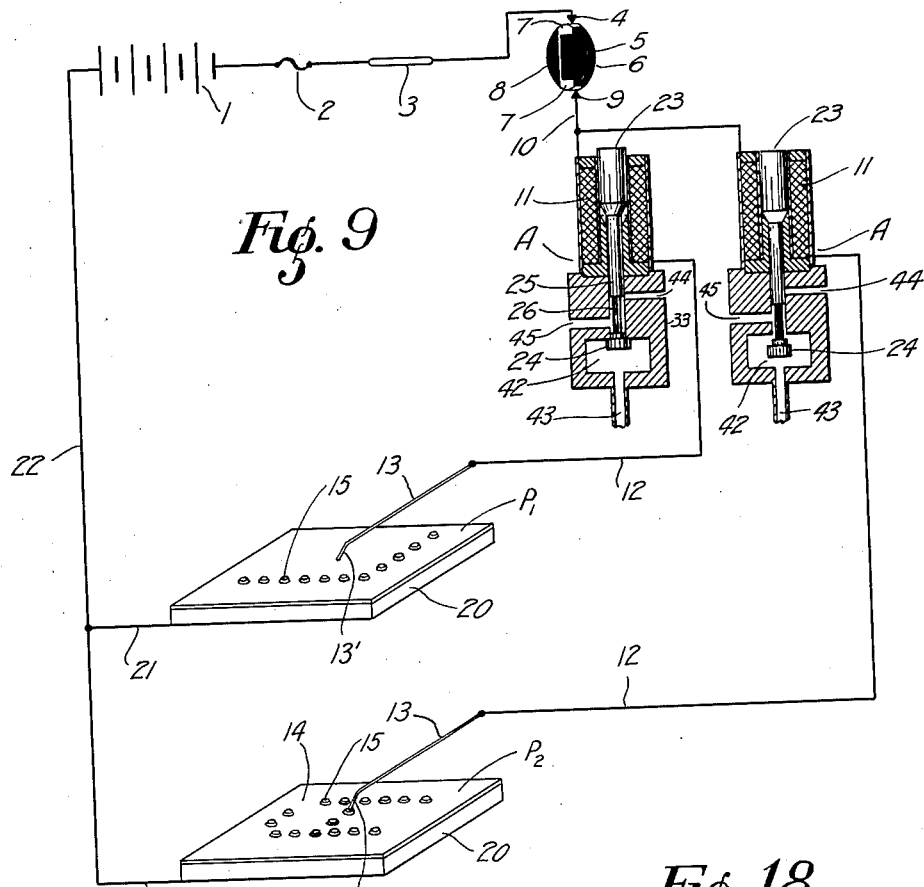
Fig. 9 is a schematic diagram showing the control and actuation of two electro-pneumatic valves from their respective contact fingers.

The general scheme of control or selective energization is shown in Fig. 9 for two contact springs 13. It will be noted that the closure of the circuit-breaker 5, i. e., the bridging of the brushes 4 and 9 through the contact segments 7—7 and their connecting strip 8, only energizes those electro-pneumatic valves A of which the contact fingers 13 contact with contacts 15 of the pattern. For instance, in the position shown in Fig. 1, the circuit-breaker 5 is closed, but only the one contact finger 13 cooperating with a row of contacts 15 of the pattern P2 closes its circuit, whereas the contact brush 13 corresponding to one row of contacts of the pattern P1 at this moment does not contact with a contact 15 and thus its electro-pneumatic valve A is not energized.

I prefer to provide a selector device which is in synchronized connection—preferably by electric means—with the punching apparatus herebefore described and to use a novel form of patterns for the selective energization of the electro-pneumatic valves A of the punching apparatus.

The selector device which is shown in Figs. 6 and 7 will be described later. I shall first proceed in describing a preferred form of patterns.

Such patterns comprise conductive and insulating portions, and preferably form types the conductive portions of which consist of individual contact points or contact strips suitably arranged in groups to define characters or designs, whereby the corresponding perforations on the paper reproduce these characters or designs essentially in the same form.

To form the patterns the types are preferably prearranged or set-up in proper disposition to constitute successive lines of a text or the elements of a design, and for this purpose I use a base platen of insulating material adapted to carry a convenient number of type lines and make provision for the continuous successive feed of the patterns, so that the resulting perforated roll, if desired, may carry an uninterrupted text or a design of any desired length.

Figures 16, 16A:
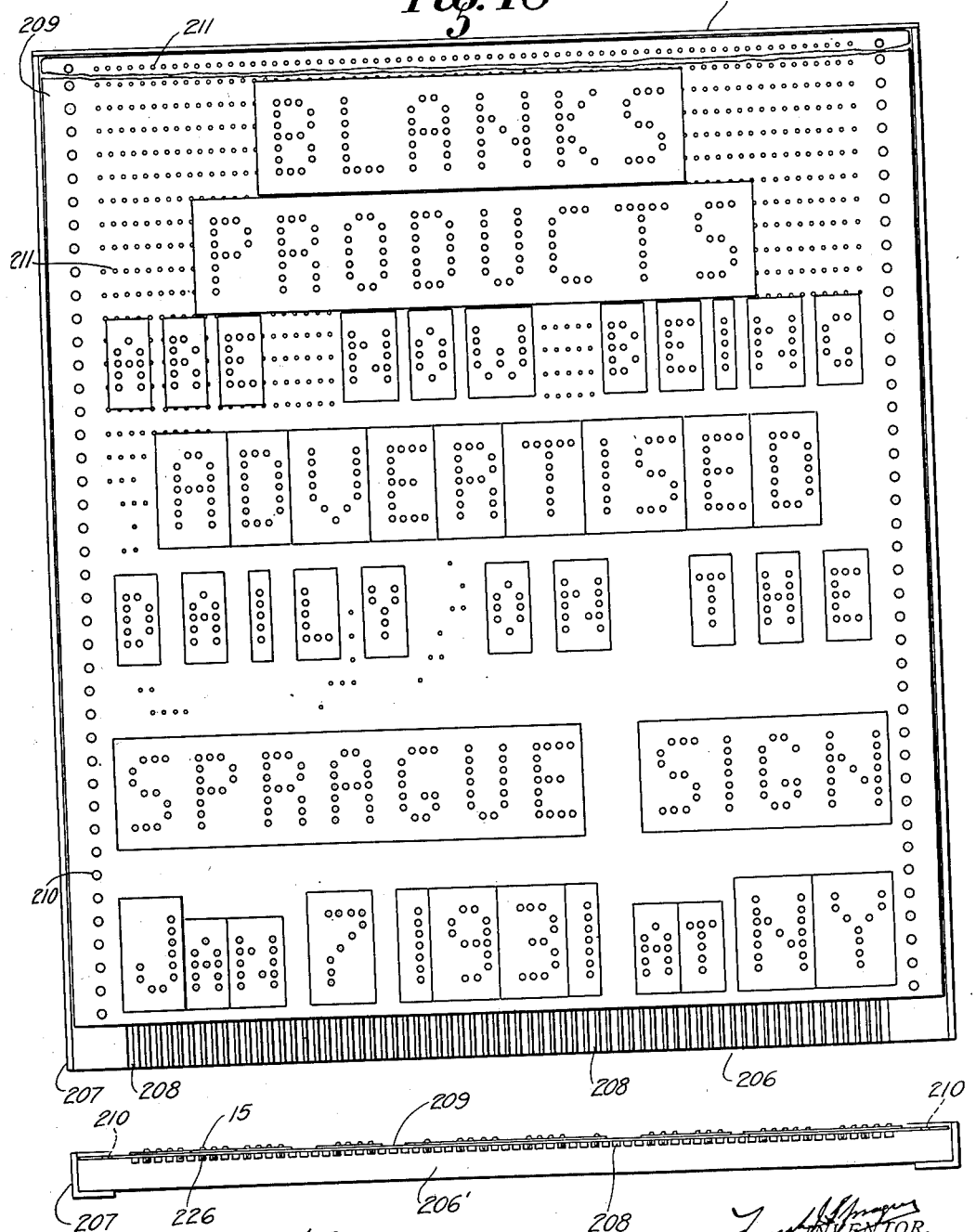
Fig. 16 is a plan view of a platen with set-up characters and the set-up tray.
Fig. 16a is an end view of Fig. 16.
Figure 17:
Fig. 17 is a portion of a record reproduced from the pattern of Fig. 16.

Fig. 16 illustrates such a pattern platen 209, which for the set-up of the types is placed in a set-up tray 206. The set-up tray 206 comprises a suitable base 206' of wood or other material, and is provided on its sides and top with retaining walls 207, illustrated as angle pieces.

The platen 209 is preferably a thin but strong sheet of insulating material; for instance, it may be a bakelite sheet.

The platen 209 is provided on each side, near the edge, with a row of guide holes 210. Between the two rows of holes 210 are horizontal rows of smaller holes 211, the latter forming a rectangular hole system substantially covering the whole platen. However, horizontal and vertical spacing of the perforations 211 need not be equal, such spacing being determined by considerations later to be discussed.

The base 206' is provided with longitudinal grooves 208 adapted to align with the vertical rows of holes 211, and provide clearance for locating pins 226 of the types later more fully described.

Figs. 12 and 12a illustrate one form of a type 220, which consists of a metallic plate or base 224, provided with embossings 222. The base 224 is covered on its upper surface and on its edges with an insulating coating 14, whereas the top surfaces of the embossings 222 are not coated and form the metallic contact surfaces 15. The contact points 15 defining the characters are selected from an imaginary rectangular point system in which the unit spacing is the same vertically and horizontally.

The base 224 is provided with a number of metallic pins 226 projecting downward therefrom, these pins being soldered or otherwise affixed to the base, preferably by having conical heads 226' which are disposed in the impressions 225 formed under the embossings 222. As a rule two pins 226 suffice for a type, one at the top and the other at the bottom thereof, preferably located diagonally opposite each other.

The number and disposition of the embossings 222 and thus of the contacts 15 of a type, is such that their arrangement conforms to the desired character or design. A succession of characters forming simple or oft-recurring words or syllables may be combined on a single base, and an example of such combination is shown in Figs. 10 and 11.

A modified form of type is shown in Figs. 13 and 14 in which successive embossings in the same horizontal and vertical lines are replaced by rectangular raised strips 222'' with their contact surfaces 15'' conductive over their entirety.

It should be noted that in view of the cooperative arrangement of the circuit-breakers 5 and fingers 13 relative to the pattern, as will later appear, only those portions of the contact surfaces 15'' are operatively effective which correspond to respective contact points 15 of the types of Fig. 12, such effective portions being indicated in cross-hatching on the second letter of the group of Fig. 13.

The type letters may be made in various ways. For instance, by stamping them out of thin metal sheets or by casting same of suitable metal. The types shown in Fig. 13 are especially well adapted for casting. When the types are cast the pins 226 are preferably integral with the type. For the insulating layer of the type I prefer to use japanning or insulating enamels.

For proper horizontal and vertical spacing of the types margins are provided around the contours of the characters of said types. For instance, if it is desired to have a minimum of three spaces between adjacent characters of a line and a minimum of four spaces between the characters of two successive lines—the spaces being expressed in distances between the centerpoints of two adjacent contacts 15—the types (as shown in Fig. 12) are provided at the top, at the bottom and at the left of the character with a margin of two spaces, whereas at the right the margin is one space. Similar margins are provided on the types of Fig. 13 and on the combinations of Fig. 10.

It is evident that other spacings can be provided by a suitable selection of the margins.

The holes 211 of the pattern plate 209 which are retaining holes for the pins 226 of the types and rectangularly cover the platen as described in connection with Fig. 16 have preferably a horizontal spacing of one space (as above defined) and a vertical spacing of two spaces. Should the vertical spacing be reduced to a single space, the vertical margins of the types would also have to be reduced to a single space.

It will be readily seen that by the previously described disposition of the locating pins 226 insertion of the types on the plate 209 is easily accomplished, and at the same time if desired the whole perforated portion of the platen 209 may be covered by a continuous text or design.

Figure 18:
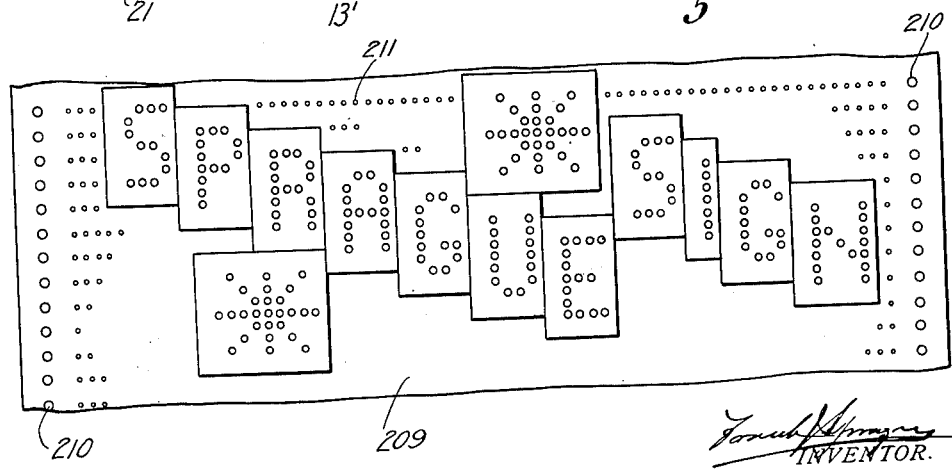
Fig. 18 is a portion of a pattern showing design types and types in staggered arrangement.

It is obvious that the margins provided on the types represent the minimum spacing between characters or lines and a more open spacing can be obtained by not adjacently placing the types. Nor is it necessary to form straight horizontal lines, but the types may be staggered as might be desirable in case of designs or to simulate various printed forms as shown in Fig. 18.

I have found, especially in the case of types made of thin material, that the insulation on the edges of the base 224 may wear off, and when such an exposed edge passes a contact finger 13, (assumed the above marginal disposition), the circuit of the corresponding electro-pneumatic valve A is completed and an undesired perforation is produced. Such occurrence can be prevented by so selecting the margins that the side edges do not align with the contact fingers 13, and the top and bottom edges pass said fingers at a time period when the circuit-breakers 5 prevent completion of the electric circuits through the fingers 13.

Types having such marginal arrangement are shown in Fig. 15. The margins are here one half, one and a half, two and a half, etc. spaces (as previously defined), thereby the side edges of the bases 224 are half-way between two vertical rows of holes 211—which as later appears—also places these edges half-way between two adjacent contact fingers 13. The top and bottom edges fall half a space from a horizontal row of holes 211, whereas as shall appear, the circuit-breakers 5 complete the circuits through the fingers 13 only at a time when a horizontal row of holes either aligns with fingers 13 or is spaced from the fingers by one unit space.

The selector device through which the patterns are fed for the selective energization of the electro-pneumatic valves A of the punching mechanism, is shown in Figs. 6 and 7. The selector device comprises a table for the feeding of the patterns, a bank of contact fingers for the selection of the electro-pneumatic valves A and a drive for the advance of the pattern, which drive is also interconnected with the drive of the circuit-breakers previously described, these circuit-breakers being preferably arranged alongside of the selector device.

The selector device comprises a base 135, which by means of four pedestals 169—169 and 169'—169' supports a platform 170 adapted to receive the platens 209. The platform approximates the length of the platen 209 and is slightly wider than the platen. It is provided with retaining walls 171—171, on each of its sides, which walls also serve as guides for the platens as the latter are moved over the upper surface of the platform 170.

The platform 170 is provided with grooves 180 paralleling the retaining sides 171 thereof, the grooves being disposed to align with the vertical rows of holes 211 of the platen and provide clearance for the locating pins 226 of the types 220, projecting downwardly through the platen. The grooves 180 start at the incoming end of the platform 170 and terminate at a point 230 corresponding about to the center line of the pedestals 169 near the outgoing end of the platform.

Carried by the extension 181—181 of the pedestals 169—169 near the outgoing end of the platform 170 is provided—in a manner later more fully disclosed—a bank of selector contact fingers 13 arranged in a single row across the platform. The contact fingers 13 are insulated from each other and their number and disposition corresponds to that of the grooves 180, and thus align with the vertical rows of holes 211 of the platen 209 when the platen is placed on the platform.

As previously explained, the spacing of the contact points 15 is such that they all fall along vertical rows of holes 211; thus it will appear that as the pattern is advanced and the types with their contact portions 15 pass under the contact fingers 13, the contacts 15 falling in any vertical row pass a selector contact 13 corresponding to said row and thus the bank of contact fingers 13 explores all of the contact points 15 or the entire operative area of the platen 209.

The extensions 181—181 form bearings 181'—181' for pivots 182—182 of an insulating cross-strip 183. On the top of the strip 183 and secured thereto is a second insulating strip 184, between which the selector contacts 13 are properly spaced and clamped. The contacts 13 are thereby securely held and insulated from each other.

The selector contacts 13 are preferably resilient springs which in their operative position slant towards the outgoing end of the platform at an angle of about 30°. At their contacting ends 13' the springs 13 are bent to an angle of about 45° and reduced in width. However, this width still exceeds the diameter of the platen holes 211, preventing the springs from dropping in these holes. At their other ends the springs 13 after passing with a horizontal portion 13", clamped between the insulating strips 183 and 184, are connected to conductors 12 leading to their respective electro-pneumatic valves A (see Figs. 1 and 8).

The upper strip 184 is provided near its two ends with arms 186—186 slanting towards the outgoing end of the platform at an angle of about 45°, these arms supporting at their free ends a transverse rod 187 of insulating material underlying the contact springs 13. The rod 187 carries insulating washers 145 which maintain the proper spacing between the free ends of adjacent contact springs 13. A second rod 189 of insulating material is mounted between the arms 186—186 at their root adjacent to member 184, said rod 189 bearing on the contacts 13 near the point where they emerge from the insulating strips 183 and 184. The rod 189 provides and maintains the desired deflection and tension of the spring contacts 13 and insures such deflection and tension to be the same for the individual springs.

Beneath the insulating strips 183 and 184 and suitably secured thereto is a plate of insulating material which extends under the contact fingers 13 approaching their contact points 13'. The plate 194 is distanced from the platform by stops 146, which provide for a proper clearance for the types; these stops also limit the downward movement of the spring contacts 13. On the other side of the contact points 13', near the outgoing end of the platform 170, is provided a loosely mounted roller 173 supported by short projecting shafts 174—174 journaled in open bearings 172'—172' formed in two upward extensions 172—172 of the retaining walls 171—171. The bearings 172'—172' freely support the roller permitting its easy rotation, upward displacement, as well as its removal.

The end of the shaft 182' of the cross-member 183 projects through its bearing 181' to carry a worm gear 190. Mounted on the outside of support extension 181 below the worm gear 190 and meshing with it is a worm 191 supported in bearings 193—193. The worm 191 is provided with a shaft 195, the left end of which carries a knurled knob 192 through which rotative adjustment of the unit comprising the contact fingers 13, strips 183 and 184, rods 187 and 189 and the plate 194, about the shafts 182—182' can be effected. Rotation of the knob permits adjustment of the contact pressure exerted by the springs 13, and also permits lifting of the unit out of its operative position.

The outgoing end of the platform 170 (starting from a point indicated as 230 on Fig. 7) is provided with a resilient contact system adapted to engage the pins 226 of the types. This contact system is shown in Fig. 3, and insures electric connection between the pins 226 of the types, and the base 170 while the types pass under the selector contacts 13.

Upright metal strips 201 are provided in three crosswise rows. The number of contact strips 201 per crosswise row is one less than the number of grooves provided on the platform 170 whereby the corresponding strips of the three crosswise rows align with each other; however, they do not form a continuation of the grooves 180, but are spaced centrally thereto.

Associated with each strip 201 is a substantially U shaped spring 203, the two legs 204 and 204' of which are parallel with the strip 201 and the central portion 205 of which is pinched to the incoming end of the strip 201. The two legs 204 and 204' of two adjacent springs of the same crosswise row, contact with each other substantially throughout their length and align with the corresponding groove 180. Such pair of spring legs 204 and 204' form a contact pair for the pins 226 of the types. When such a pin 226 leaves its groove 180 it engages the contact pair aligning with this groove, whereby a wiping contact is established between the pin and the contact pair which is maintained during the passage of the pin 226 between the contact pair.

The springs 203 of two successive strips 201 overlap each other to such extent that the contact at a pin 226 is not broken when it passes from one contact pair to the next pair in advance.

While three successive rows of strips 201 and of corresponding springs 203 are shown, the number may be varied. However, it is advisable that when a type passes the selector contacts 13 at least two of its pins 226 should be simultaneously engaged by the spring contacts 203—203.

For the advance of the platen 209 I provide, as shown in Figs. 6, 7 and 8, a toothed drum 141 having its shaft 140 journaled in pedestal bearings 134—134 supported on the base 135 beyond the outgoing end of the platform. Thereby the platen 209 tangentially passes over the drum, and upon rotation of the drum its teeth 143 successively engage the guide holes 210 of the platen 209.

As the platen and its types leave the outgoing end of the platform 170 and pass over the drum 141, the downwardly projecting pins 226 of the type occupy peripheral clearance grooves 142 provided on the drum, said grooves being similar in size and relative disposition to the grooves 180 of the platform 170.

One end of the shaft 140 (shown as the upper end on Fig. 6) is extended to carry a worm gear 133 adjustably affixed thereto and secured in its desired position by two lock nuts 147—147, beyond which the free end of the shaft is journaled in a third bearing 134' also supported on the common base 135.

The worm gear 133 is driven by means of a worm 132 of a driving shaft 130, the latter being journaled on its two ends in bearings 131—131 affixed to the base 135. The shaft 130, near its center is provided with a worm gear 129, driven by a worm 128 provided on a shaft 126, which is journaled at one end in a bearing 127 mounted on the base 135, this shaft being that of an electric or other suitable motor (not shown). As will appear, counter-clockwise rotation of the motor shaft 126 produces through the worm 128, worm gear 129, shaft 130, worm 132 and worm gear 133, a similar rotation of the drum 141, which when engaging with its teeth 143 the guide holes 210 of a platen 209 provide for a continuous advance of the pattern to and beyond the selector contacts 13. A frame 240 is provided at the outgoing end of the platform beyond the drum 141 to receive the patterns as they leave the selector device.

As the engagement of the holes 210 by the teeth 143 of the drum 141 only takes place after the head end of the platen 209 has left the platform 170 and synchronism between the advance of the platen and the other apparatus (the circuit-breakers and the punching mechanism) is only established through the drum 141, it is necessary that the first platen of a series of platens be provided with a blank entering margin corresponding or slightly exceeding a distance a, shown in Fig. 7, which is approximately the distance between the selector springs 13 and the engagement point of the teeth 143 with the guide holes 210.

Once synchronism is established, additional platens do not require such blank margins, provided such platens are fed to closely follow the preceding platens.

The plate 194 and the roller 173 previously described are provided to prevent the raising or rocking of the types as they engage the selector springs 13.

The pivotal mounting of the unit carrying the contacts 13 previously described, provides besides adjustment of the contact pressure, easy access to the nest of contact springs, for cleaning and inspection, after the contact carrying unit has been swung upwards.

The open bearings 172—172 allowing easy removal of the roller 173, further aid in making accessible the entire portion of the platform 170 occupied by the nest of springs 203.

The passage through the selector device of a pattern actuates, as before described, the punches 63 to produce on the roll 69 a simulation of the characters of the pattern in which the type or designs of the pattern are defined by perforations.

The perforated roll may in turn be used as a pattern for the repeated duplication of the original, and for this purpose I prefer to make the perforated roll a duplicate of the original pattern, not only in respect to the relative disposition of the guide holes 210 with the guide holes 96, and the contact surfaces 15 of the types with the holes 99 produced thereby, but also in their actual size and spacing, so that when the roll 69 is used as a pattern for duplication the perforations 99 forming the letters or designs of the new pattern present an organization of holes to the contact fingers 13, corresponding in size and disposition to the contact surfaces 15 of the original pattern.

In using a perforated roll as a pattern the contact fingers 13 contact directly through the pattern, i. e., through the holes 99 of the roll 69, with the platform 170 and thus complete directly through the platform 170 the circuits of the selected electro-pneumatic valves A. A thin metal plate (not shown) is placed over the platform 170 covering the nest of springs 203 and presents a smooth conductive surface to the contact fingers 13.

I provide beyond the entering end of the platform a spool 179 adapted to receive the perforated roll to be duplicated, and a second spool 165 in the rear thereof, which is driven by means later more fully described, and which serves to rewind the roll after its passage under the contact fingers 13 and over the drum 141.

As has been stated the guide holes 96 of the paper are disposed similarly to the guide holes 210 of the platen and therefore engage in the same way the teeth 143 of the drum 141.

Bearings 178—178 affixed to the base 135 at the entering end of the platform removably and loosely support the spool 179 by means of retractable pivots 167'—167' carried by the knurled knobs 167—167. The spool 165 located about midway along the length of the base 135 is pivotally and removably supported between pedestal bearings 151 and 168.

The pedestal bearings 168 is similar to, but lower than the bearing 178, while the bearing 151 is provided with an outward extension 151' supporting a shaft 150. The shaft 150 extends inwardly and on its end 157 it is provided with a transverse pin 166 adapted to engage corresponding slots 166' in the ends of the spool.

The spool 165 is driven from the drum 141 by means hereafter described.

The shaft 150 extends beyond the bearing extension 151' and loosely carries on its extended portion a sprocket 149, which, however, does not operatively engage the shaft 150. Attached to the sprocket 149 by means of a tubular extension 149' is a friction disc 152. Loosely carried by the shaft 150 is a friction washer 153 of fibre or other suitable material, interposed between the friction disc 152 and a similar disc 154. The disc 154 is provided with a collar 154'. A pin 160 engages the collar 154' and a slot 160' provided along the shaft 150. The pin 160 thereby prevents rotation of the disc relative to the shaft 150, but at the same time permits lateral movement of the disc 154 along said shaft.

The outer end of the shaft 150 is threaded at 150' to receive a nut 164, which bears a washer 164' between which and the disc 154 is interposed a spring 162 pressing against the disc 154 and thus against the washer 153 and the disc 152. Adjustable frictional engagement between the disc 152 and its sprocket 149, and the shaft 150 (through engagement of the pin 160 of disc 154 with the slot 160' of said shaft) and its transverse pin 166 is thus established, the friction depending upon the adjustment of the spring tension.

A sprocket 144 is fixedly mounted on the shaft 140 of the drum 141, between the pedestal bearings 134 and 134', said sprocket being larger in diameter than the sprocket 149 carried by the shaft 150. The sprocket 149 is driven from the sprocket 144 by means of a chain 148 at a rate inversely proportional to the sprocket diameters.

As the paper is wound up on the roll 165 the outside diameter of the spool increases due to the successive layers of the paper wound thereon. Should the speed of the shaft 150 be kept at a constant ratio relative to the speed of the shaft 140, the increasing diameter of the paper wound on the spool 165 would tend to tear the paper as it is unwound from the drum 141. To maintain the advance of the paper constant, a slip is provided between the sprocket 149 and the shaft 150 by the means previously described, whereby such slip prevents tearing of the paper.

All of the circuit-breakers previously described are carried by the shaft 130 on its portion extending beyond the worm gear 129 toward the incoming end of the selector. These circuit-breakers include four circuit-breakers 5, one circuit-breaker 5' and a circuit-breaker 37 and a circuit-breaker 82, the latter two circuit-breakers being of double width.

The construction of the circuit-breakers has been previously described; here it should be noted that the contact brushes as shown in Figs. 6 and 7 are preferably disposed on the two sides of the cylinders, instead of at the top and bottom as shown diagrammatically in Figs. 1, 2, 8 and 9, and are carried in this disposition on two strips 260—260 of insulating material, mounted on the base 135.

The cycle of operation is as follows:

The four circuit-breakers 5 and the circuit-breaker 37 operate simultaneously except that the circuit-breaker 37 is only closed for every second closure of the circuit-breaker 5, whereby thus this circuit-breaker 37 is closed once for every revolution and the circuit-breaker 5 twice for every revolution. Closure of the circuit-breakers 5 and 37 causes through the energization of the electro-pneumatic valves A and the electro-pneumatic valves E and F, respectively, the perforation of the character holes 99 and of the guide holes 96.

After upon rotation of the shaft 130 the circuit-breakers 5 and 37 have reopened their respective circuits, the circuit-breaker 5' is brought in a position to close the energizing circuit of the electro-pneumatic valve D and thus to unlock the pawl 113.

Upon further rotation of the shaft 130 following the closure of the circuit-breaker 5', but before its reopening, the circuit-breaker 82 is closed to energize either the electro-pneumatic valve B or C; these valves being, as previously described, alternately energized at each half revolution.

From the foregoing it appears that the common shaft 130 serves to drive the circuit-breakers as well as the drum 141. The rate of advance of the pattern is determined by the rate or rotation of the drum 141, and the rate of advance and perforation of the paper roll in the punching apparatus is determined by the rate of rotation of the circuit-breakers. Thus, the rates of advance of the pattern and of the paper are properly synchronized. It should be noted, however, that while the advance of the pattern is continuous, the advance of the paper is intermittent.

For reasons previously outlined I prefer to not only maintain a fixed relation between the advance of the pattern and that of the paper, but also to make the steps of advance equal.

To produce a perforated record from a pattern, a roll of paper or similar material is set up on the spool 70 and passed through punch block 64—66. The end of the paper is tapered and is first pulled manually through the punch blocks and secured to the drum 70'. Thereafter the switch 3 is closed, pressure air supplied, and the motor driving the shaft 126 started. As the paper passes the punches and assumes its full width, the punches 63e and 63f start punching the guide holes 96. The guide holes 96 are now engaged with the teeth 98 of the drum 70' and the end of the paper secured to the take-up roll 97. The paper is now ready to receive perforations.

The pattern from which the record is to be punched is set up on the set-up tray 206, whereby a platen 209 is placed on the tray and the types set up according to the text or design required, quite similarly to type-setting for printing. The pins 226 of the types thereby engage the holes 211 of the platen 209 and secure the types on the platen.

The first pattern, as previously explained, is provided with a head margin and is placed on the platform 170, and manually advanced to and beyond the selector springs 13 until the guide holes 210 engage the corresponding teeth 143 of the drum 141.

After such engagement, the pattern is advanced automatically through rotation of the drum 141. At the same time the contacts 15 of the types pass under the selector contacts 13, and the circuits of the electro-pneumatic valves A are energized selectively during the closure of the circuit-breakers 5. The time of closure of the circuit-breakers 5, as stated, is such that the circuits of the electro-pneumatic valves A are both made and broken at the circuit-breakers 5 rather than at the contacts between 13 and 15. Energization of the selected electro-pneumatic valves A causes the corresponding punches 63 to perforate the paper 69, whereby the perforations 99 so effected, correspond in disposition to that of the contacts 15 of the types.

Following the closure and opening of the circuit-breakers 5, the circuit-breaker 5' is closed, thereby releasing the pawl 113. During the release of the pawl 113, the circuit-breaker 83 closes in turn the circuit of either one of the electro-pneumatic valves B or C, causing thereby the drum 70' and the record to advance by one space.

The circuit-breakers 5' and 83 reopen before the following row of contacts 15 engage the selector contacts 13. Upon such engagement selective energization of the magnets A takes place, corresponding to the disposition of the contacts 15 in this row, and the corresponding perforations will appear on the record one space in the rear of the row of holes previously perforated.

The interlinear space between the rows of perforation as well as the cross-wise spacing of the perforation is in a fixed proportion or preferably equal to the corresponding spacing of the contacts 15. Further rotation of the shaft 126 causes further advance of the pattern and repetition of the cycle of operation.

The circuit-breaker 37 is closed at every second closure of the circuit-breakers 5 and through energization of the corresponding magnets E and F provides the guide holes 96 on the record, these holes being spaced at twice the interlinear spacing of the perforations 99.

To provide proper adjustment for synchronism between the worm gear 133 and the circuit-breakers, the drum 141 is released from the shaft 130 in the way previously described and rotated until it is properly synchronized with the circuit-breakers, in which position it is secured. Thus the drum 141 and shaft 130 are again connected.

In case it is desired to duplicate a record from a master record instead of a pattern, the master record is inserted on the spool 179 and threaded over the platform 170 and through springs 13, over the drum 141 and the take-up bobbin 165. In this case, as stated, a metal strip is placed over the nest of contact springs 203 to complete the electric circuits, which are now established through the perforations 99 of the master record. The guide holes 96 thereby engage the teeth 143 of the drum 141, and the advance of the master record and its cooperation with the other parts of the mechanism is the same as in the case of the pattern.

It will be realized that my invention has various important advantages and permits the perforation of records in a simple expedient way well adapted for commercial production. Operating speeds as high as 300 to 400 lines of perforations per minute, can be thereby obtained, giving perfect records without any inaccuracies due to omitted, misplaced or undesired perforations.

The only operation requiring skill is the setting-up of the patterns, which is done much along the lines of regular type-setting. However, setting-up by my method provides for much greater flexibility than regular type setting, as characters of any type and size may be intermingled and arranged in any desired spacing in straight or staggered lines, and combined in any suitable way with designs.

No special skill is required for the feeding of the pattern onto the selector device and once engagement of the teeth 143 of the drum 141 with the guide holes 210 of the first pattern is obtained, the subsequent patterns are simply fed in close succession. Thereby types of the tailend line of a pattern may extend to the headend line of the succeeding pattern.

In case the record is made from a master record, the operation is even simpler. In this case after the threading of the master record, the whole operation is entirely automatic.

The selector control device is separately claimed in the copending divisional application Ser. No. 652,715, filed January 20, 1933.

While I have described my invention in connection with specific embodiments, I do not wish to be limited to such and the appended claims should be construed as broad as permissible in view of the prior art.

What I claim as new and what I desire to secure as Letters Patent is:

1. In a mechanism for selective perforation of records, a record perforating mechanism and an electric circuit arrangement therefor including a circuit-breaker, a record advancing mechanism and an electric circuit arrangement including a second circuit-breaker, said first and second circuit-breakers being rotated in synchronism and having their periods of closure shifted in respect to each other.

2. In a machine for selective perforation of records, a record perforating mechanism and electro-pneumatic devices to govern same, circuits for said electro-pneumatic devices including a circuit-breaker, means to lock the record to be perforated and electro-pneumatic means to counteract such locking means, an electric circuit comprising a circuit-breaker for said unlocking means, said first and second circuit-breakers being rotated in synchronism, but being shifted in phase in regard to their time of effective operation.

3. In a machine for the selective perforation of records, a record advancing mechanism comprising a drum, a double-head piston, electro-pneumatic means to admit pressure air alternately to each of said pistons, and means actuated by said pistons to uniformly advance said drum upon admission of air to either of said pistons.

4. In a machine for selective perforation of records, in combination a pattern advancing mechanism, a record advancing mechanism and a record perforating mechanism, electro-pneumatic means to control the record advancing and record perforating mechanisms, electric circuits for said electro-pneumatic means comprising circuit-breakers, and common driving means for the pattern feeding mechanism and said circuit-breakers.

5. In a device for the selective perforation of records, types having individual contacts arranged in an imaginary rectangular system, means for the automatic advance of said types, a bank of selecting contacts arranged crosswise to the direction of advance of said types, electric circuits for each selector contact and an electro-pneumatic valve in each circuit, a common source of current supply and a circuit-breaker for said circuits intermittently closing said circuits for a time slightly exceeding the time of passage of a type contact under a selector contact.

6. In a selective perforating mechanism, a source of pressure air, an electro-pneumatic valve and a plunger operated by said pressure air and controlled by said electro-pneumatic valve, a punch actuated by said plunger and means to selectively energize said electro-pneumatic valve to admit air to the plunger and to actuate said punch.

7. In a machine for perforating records, a pattern and means for the continuous advance of the pattern, advancing mechanism for the stepwise advance of the record and synchronizing means to so advance the record that each step of advance is proportionate to such advance of the pattern which takes place between two successive steps of the record.

8. In an apparatus for the perforation of records, a pattern provided with guide holes and means to engage said guide holes to advance the pattern, means to perforate guide holes in the record and means to engage said guide-holes for the advance of the record during its perforation, said record guide holes having a spacing and disposition adapted to engage the pattern advancing means, said advancing means causing the advance of the perforated record when the latter serves as a master record for perforation of a second record.

9. In an apparatus for selective perforation of records, electrically controlled perforating means for the record, a contact carrying pattern, and a pattern feeding device comprising a platform, pattern advancing means and selector contacts, said selector contacts adapted for the selective energization of said perforating means through their engagement with the pattern contacts, said pattern advancing means being also effective for the advance of a perforated master record, whereby selective perforation of a new record is obtained through engagement of the selector contacts with the perforations of the master record.

10. In a machine for the selective perforation of records, a platen adapted to receive individual contact carrying types to form a pattern, said platen being provided with guide holes, a platform adapted to carry said platen and a rotatable toothed drum adapted to engage the guide holes of said platen and advance said platen, selector contacts transversely disposed in regard to the advance of the pattern, and electro-magnetic punching means actuated through the engagement of the type-contacts with the selector contacts.

11. In a machine for selective perforation of records, a toothed drum adapted to rotate at a constant speed, a contact-carrying pattern having guide holes, said guide holes adapted to engage teeth of said drum to advance said pattern by rotation of said drum, a group of circuit-breakers adapted to rotate in unison with said drum, a selector bank disposed transversely to the direction of advance of said pattern and having contacts which upon advance of said pattern engage line by line the contacts of the pattern, electrical circuits including said selector contacts and a circuit-breaker of said group adapted to intermittently close said electric circuits, record punching magnets controlled by said electrical circuits adapted to punch holes in the record, and electrical means to intermittently advance and lock the record, and another circuit-breaker of said group to control said electrical means.

FRANK J. SPRAGUE.